(12) United States Patent
Dorninger et al.

(10) Patent No.: US 6,838,025 B2
(45) Date of Patent: Jan. 4, 2005

(54) METHOD AND AN APPARATUS FOR ADJUSTING AN EXTRUSION DIE IN AN EXTRUDER

(75) Inventors: Frank Dorninger, Micheldorf (AT); Gordon Fattmann, Detmold (DE); Oliver Krüll, Paderborn (DE); Andreas Limper, Freudenberg (DE); Meinhard Schwaiger, Linz (AT); Stefan Seibel, Kirchborchen (DE)

(73) Assignee: Technoplast Kunststofftechnik GmbH, Micheldorf (AT)

( * ) Notice: Subject to any disclaimer, the term of this patent is extended or adjusted under 35 U.S.C. 154(b) by 379 days.

(21) Appl. No.: 10/140,246

(22) Filed: May 8, 2002

(65) Prior Publication Data

US 2002/0185765 A1 Dec. 12, 2002

(30) Foreign Application Priority Data

May 9, 2001 (AT) .............................. 740/2001

(51) Int. Cl.[7] .......................... B29C 47/92; B29C 47/38; B29C 47/60; B28C 3/20
(52) U.S. Cl. ............. 264/40.1; 264/176.1; 264/211.21; 264/211.23
(58) Field of Search ............................ 264/40.1, 176.1, 264/211.21, 211.23

(56) References Cited

U.S. PATENT DOCUMENTS

| 4,093,692 | A | * | 6/1978 | Hill ............................ 264/540 |
| 4,425,790 | A | * | 1/1984 | Bice et al. ................. 73/54.05 |
| 6,561,011 | B2 | * | 5/2003 | Collin et al. ............... 73/54.09 |

FOREIGN PATENT DOCUMENTS

| DE | 3642757 | 7/1987 |
| EP | 00899556 | 3/1999 |

* cited by examiner

*Primary Examiner*—Stephen J. Lechert, Jr.
(74) *Attorney, Agent, or Firm*—Dykema Gossett PLLC

(57) ABSTRACT

The invention relates to a method for adjusting an extrusion die in an extruder by recording at least one master flow curve (40, 41) in a first extruder to which the extrusion die is optimized, in which curve the volume flow is entered over the pressure, which master flow curve (40, 41) is obtained in a measuring channel (20) which branches off in the extruder, the extrusion die or in any interposed adapter part from the flow channel (4), and the repeated recording of flow curves (30, 31) in the same or similar measuring channels (20) as in the first extruder after the assembly of the extrusion tool in the extruder to be checked and adjusted, and the purposeful change of process parameters for such a time until the flow curves (30, 31) correspond to the master flow curves (40, 41) within predetermined tolerance ranges.

10 Claims, 5 Drawing Sheets

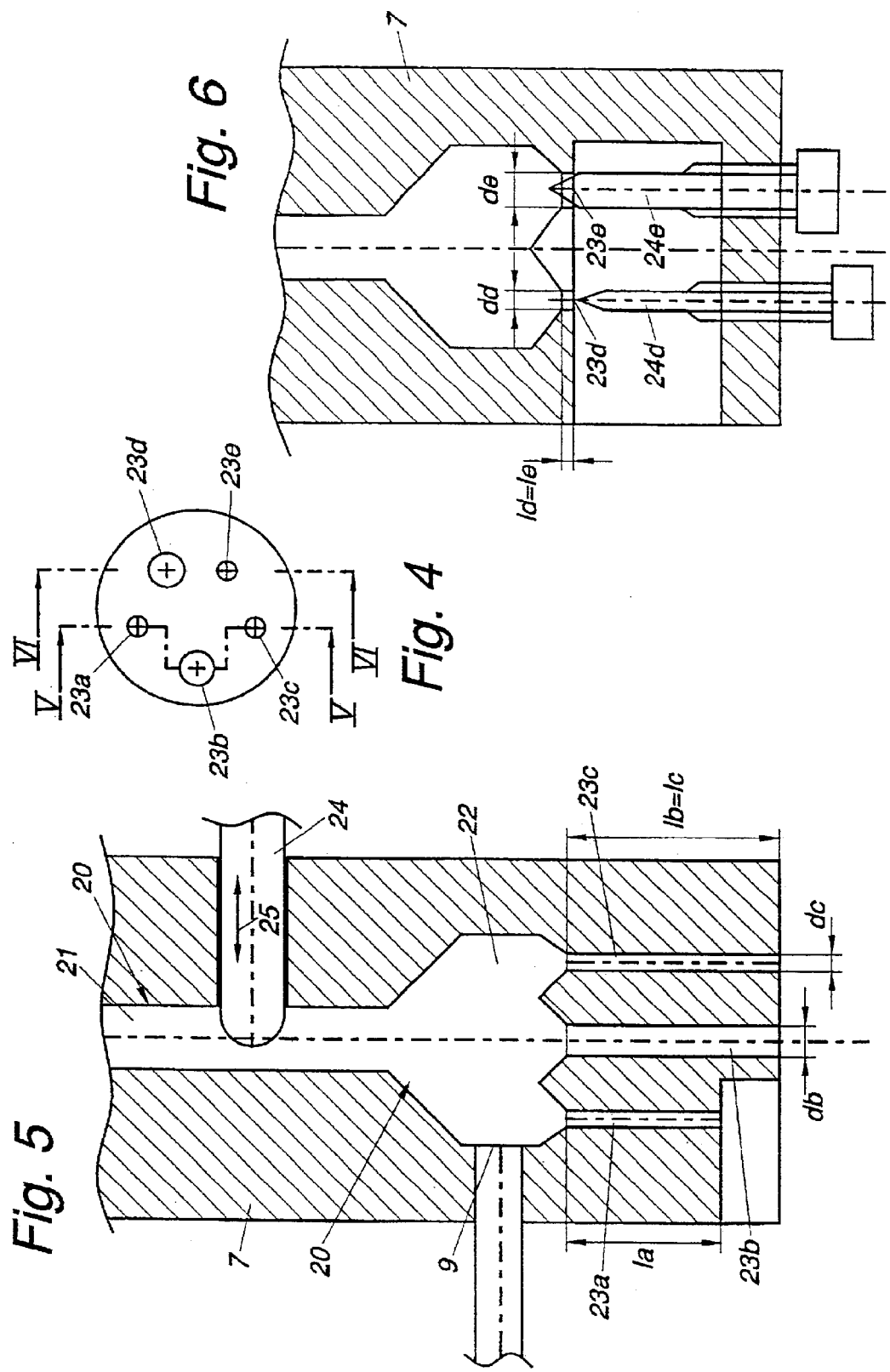

METHOD AND AN APPARATUS FOR ADJUSTING AN EXTRUSION DIE IN AN EXTRUDER

BACKGROUND OF THE INVENTION

The present invention relates to a method and an apparatus for adjusting an extrusion die in an extruder.

An extruder for producing plastic profiles as are required for the production of plastic window frames for example are usually designed in such a way that an adapter part is provided adjacent to the extruder cylinder in which the endless screws are disposed, which adapter part forms the transition to the extrusion die. The cross-sectional progress of the respective profile is already substantially shaped in the extrusion die in order to be finally determined in the subsequent dry and/or wet calibration. In order to increase the productivity of the extrusion process, processing is carried out with ever increasing extrusion speeds. At the same time, demands placed on the quality of the produced profiles are also increasing. A high quality of the profiles can be achieved at higher extrusion speeds only with an extremely careful calibration of the extrusion dies with simultaneous adherence to a precisely defined operational state in the extruder. Such a calibration is only valid for a precisely defined raw material.

In order to detect the operational state of the extruder it is known to detect the pressure and the temperature of the melt in the region of the adapter part. For this purpose a pressure sensor and a temperature sensor are disposed in the zone of the flow channel of the melt for example. This allows detecting the operational state of the extruder. In the production of a new extrusion die, the calibration is performed by the manufacturer of the die. The procedure followed is such that the die is provided upstream with an extruder which is the same or similar to the extruder with which the die is operated after delivery by the customer. The relevant aspect for the calibration is also the use of the same basic material as in later production.

It has been noticed that at high extrusion speeds or during the extrusion of profiles with low wall thicknesses and generally under high requirements placed on the quality of the profile, such as in the case of narrow tolerances, only unsatisfactory results are achieved even in the case of optimal calibration of the die at the manufacturer after the delivery of the die to the customer. One reason is obviously that even extruders of the same design show slight differences which for example are caused by production tolerances, wear and tear or the like. The inventors of the present invention have recognized that such differences can be present even in cases where the measurements in the adapter part show identical values for temperature and pressure. In the inventors' opinion this is linked to the fact that the rheological properties of the plastic melt cannot be sufficiently described with the parameters pressure and temperature alone. One consequence of this fact is that after the assembly of the extrusion die at the customer's location, it is necessary to perform work-intensive calibration runs during which it is attempted to eliminate determined deficiencies in the profile by changing the extrusion conditions, such as the screw speed, heating output and the like. Since it is very difficult to find out which deviation is responsible for the occurrence of a certain deficiency, such as a deteriorated surface quality in a specific partial zone of the profile, such work is usually labor-intensive and cumbersome.

It is further known to flange so-called rheometer nozzles on an extruder, which nozzles are arranged as slotted nozzles. The material data thus obtained have proven to offer insufficiently meaningful information, especially in connection with the material of PVC, for the actual extrusion process, which means that a fine adjustment on the basis of the data thus gained is not possible.

DESCRIPTION OF PRIOR ART

From DE 36 42 757 A, a measuring apparatus is known in which rheological properties of an extrusion material are performed by the measurement of the pressure drop in the main flow. Such a method is possible when lines of individual spinnerets start out from an extruder. Such measuring methods cannot be used in a satisfactory way in extrusion apparatuses in which an extrusion die is provided directly next to an extruder.

EP 0 899 556 A relates to a measuring apparatus in which measurements are performed on the basis of a material flow which is gained directly from the extruder. It has been noticed, however, that measuring results are obtained which are not very meaningful.

SUMMARY OF THE INVENTION

It is an object of the present invention to allow the adjustment of a die to another extruder by way of the simplest possible method. Such extruders may principally concern extruders of similar design which need not necessarily behave in the same way during operation or may concern extruders of different design.

A further object of the present invention is in the case of a change of raw material to adjust in the simplest possible way an extrusion system with an extruder and an extrusion die to the new raw material.

The first object is achieved in accordance with the invention in such a way that by recording at least one master flow curve in a first extruder to which the extrusion die is optimized, in which curve the volume flow is entered over the pressure, which master flow curve is obtained in a measuring channel which branches off in the extruder, the extrusion die or in any interposed adapter part from the flow channel, and the repeated recording of flow curves in the same or similar measuring channels as in the first extruder after the assembly of the extrusion tool in the extruder to be checked and adjusted and the purposeful change of process parameters for such a time until the flow curves correspond to the master flow curves within predetermined tolerance ranges.

The second object is achieved in accordance with the invention in such a way that by recording at least one master flow curve in a first extrusion system which is optimized to the raw material in which the volume flow is entered over the pressure, which master flow curve is obtained in a measuring channel which branches off in the extruder, the extrusion die or in any interposed adapter part from the flow channel and the repeated recording of flow curves in the same or similar measuring channels as in the first raw material after performing extrusion tests with the raw material to be examined and the purposeful change of process parameters for such a time until the flow curves correspond to the master flow curves within predetermined tolerance ranges.

The common aspect of both methods is that based on a state of optimal adjustment of a system which consists of three main components, namely an extruder, extrusion die and raw material, a new system in which one of the main components has been changed can be brought rapidly and simply again to a state of optimal adjustment. In the first case this is the exchange of the extruder and in the second case the change of the raw material. In the most extreme of cases it is also possible that two main components, namely extruder and raw material, are changed simultaneously.

It has been noticed that the high complexity of the setting of an extrusion system is caused among other things by the fact that the rheological material properties of the plastic melt at a certain point in time depend among other things on the previously occurring deformation, the so-called previous shear history. Due to the extremely complex viscosity behavior of the employed PVC materials, it is not possible to derive a rheological description of the material behavior in the melt flow from a pressure and temperature measurement alone. This is especially taken into account with the present invention. It was surprisingly noticed that the recording of a flow curve leads to a finger print of the material at a certain point in time which is so meaningful that the behavior in the die can be forecast. This means that whenever the flow curve is the same for two different extruders or for two different materials one can expect a substantially similar behavior in the die. A particularly favorable correspondence can be achieved when two or more flow curves which are associated to different measuring channels are compared.

The advantage of the present invention is that with a relatively simple and small device, the viscosity behavior of the plastic melt is examined in a respectively stationary unchanged operation of the extrusion system under production conditions in a branched melt flow whose inflow channel is provided with a variable throttle in such a way that the branched melt flow can be guided with a changed melt pressure through a specially configured capillary.

In a particularly preferable embodiment of the invention it is provided that the measuring channel is provided with a feed section, a measuring chamber and at least one capillary disposed downstream of the measuring chamber and that the pressure sensor is disposed in the zone of the measuring chamber. Imprecisions in the measurement can thus be minimized.

A particularly simple evaluation of the measuring results is possible when at least two capillaries are provided whose ratio of length to diameter is equivalent by approximation. It may additionally be provided that at least one capillary is provided whose length is smaller than the double diameter, with said capillary preferably being designed in a closeable way. In this manner it is possible to determine the inflow pressure loss into the capillary substantially independent from the pressure loss in the capillary, so that it is possible to work out the influence of the inflow into the capillary.

BRIEF DESCRIPTION OF THE DRAWINGS

The invention is now explained in closer detail by reference to embodiments shown in the drawings, wherein:

FIG. 4 shows a cross-sectional view through the apparatus in the zone of the capillaries in a further embodiment of the invention;

FIG. 5 shows a sectional view along line V—V in FIG. 4,

FIG. 6 shows a sectional view along line VI—VI in FIG. 4, and

DETAILED DESCRIPTION OF THE PREFFERED EMBODIMENTS

Figure 1:
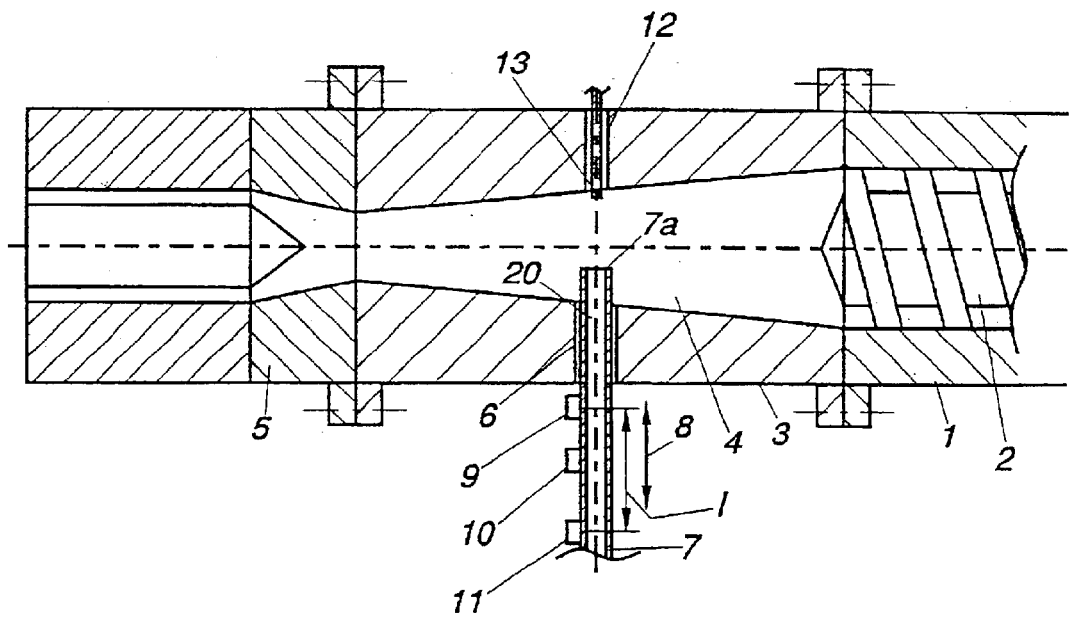
FIG. 1 schematically shows a first embodiment of the invention.

FIG. 1 schematically shows the downstream portion of an extrusion cylinder 1 with endless screws 2 disposed therein. An adapter part 3 is screwed onto the extrusion cylinder 1, which adapter part is provided with a flow channel 4 which tapers in the direction of extrusion. Optionally, the adapter part can be provided with a multi-part arrangement. The plastic melt is homogenized in the flow channel 4 and the cross section changes continuously from the spectacle-shaped opening at the output of the extrusion cylinder to a round cross section. An extrusion die 5 is situated adjacent to the adapter part 4 in which the actual cross-sectional shape of the profile to be produced is formed. In the middle section of the adapter part 3 there is a radially aligned bore 6 in which a tube 7 is held movably in the axial direction (double arrow 8) in which a measuring channel 20 is formed with a rectangular cross section. This ensures that the front opening 7a of the tube penetrates differently far into the flow channel 4 of the adapter part 3. The thickness of the tube 7 is shown on an exaggerated scale in order to elucidate the illustration. During the measuring process, plastic melt is guided out of the flow channel 4 by the measuring channel 20. A first pressure sensor 9, a temperature sensor 10 and a further pressure sensor 11 are disposed on the tube 7 outside of the adapter part 3. The two pressure sensors are disposed at a distance I of approx. 100 mm from one another. These measuring devices allow determining both the temperature as well as the pressure over the cross section of the flow channel 4. It is particularly advantageous, however, that the viscosity of the plastic melt can be determined not only indirectly via the pressure, temperature and the known material properties, but can also be calculated directly from the determined pressure drop between the first and the further pressure sensors 9 and 11.

A further temperature sensor 13 is disposed in a conventional manner in a further bore 12, which sensor additionally detects the temperature at a predetermined point of the flow channel 4.

Figure 2:
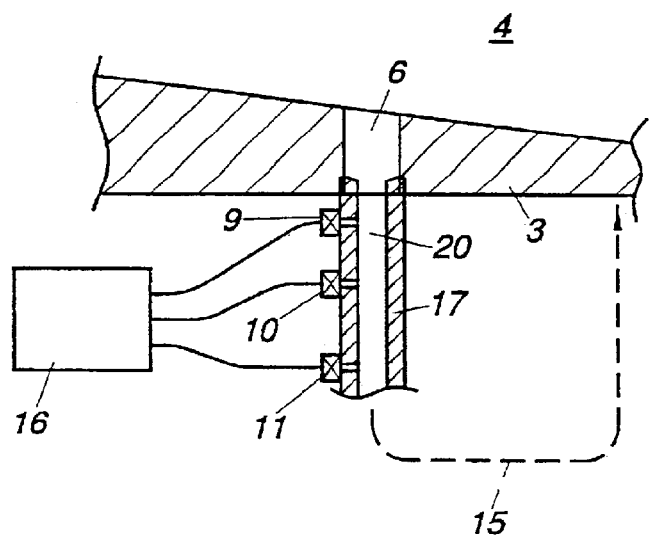
FIG. 2 shows a detail of a further embodiment of the invention.

In the embodiment of FIG. 2, a tube 17 with a measuring channel 20 is screwed directly into a bore 6 of the adapter part 3 in order to thus be in connection with the flow channel 4. The pressure sensors 9 and 11 and the temperature sensor 10 are in connection with the schematically shown device 16 for evaluating and displaying the measuring results. Reference numeral 15 schematically shows a possibility which is used for returning the melt which was originally drawn off through the measuring channel 20 to the extruder. In this case it will generally be necessary to integrate the measuring channel in the adapter part.

Figure 3:
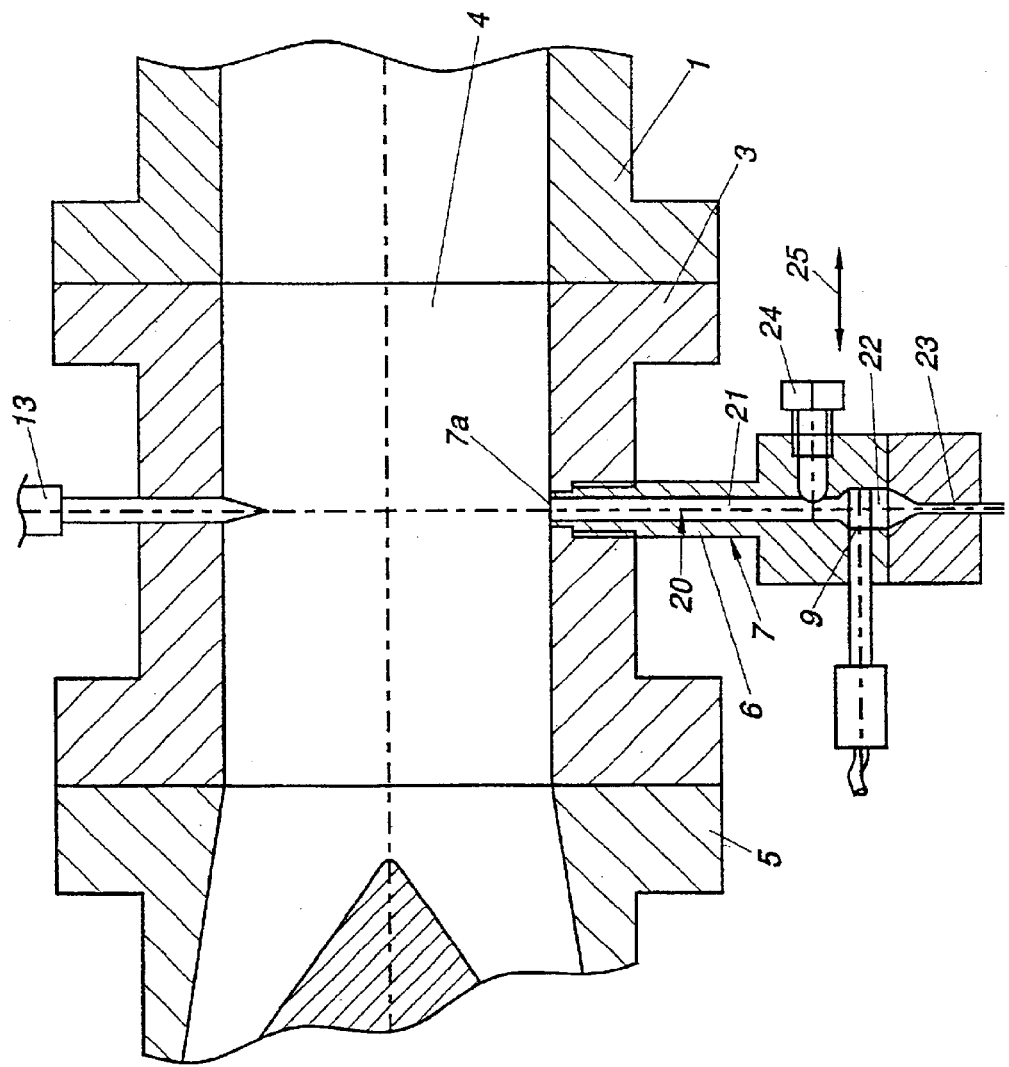
FIG. 3 shows a further embodiment of the invention.

In the embodiment according to FIG. 3, the measuring channel 20 consists of a feed section 21, a measuring chamber 22 and a capillary 23 which is disposed downstream of the measuring chamber 22. A pressure sensor 9 is disposed in the zone of the measuring chamber 22. An adjustable throttle 24 is provided in feed section 21 upstream of the measuring chamber 22, which throttle allows changing the inflow cross section. The throttle 24 consists of a tongue which is disposed movably in the direction of the double arrow 25 in tube 7.

The embodiment of FIGS. 4 to 6 corresponds substantially to the one of FIG. 3 with the difference that a total of five capillaries 23a, 23b, 23c, 23d and 23e are provided. The lengths and diameters of the individual capillaries are chosen according to the following table:

| Capillary | Length (mm) | | Diameter (mm) | |
|---|---|---|---|---|
| 23a | la | 30 | da | 2 |
| 23b | lb | 45 | db | 3 |
| 23c | lc | 45 | dc | 2 |
| 23d | ld | 1 | dd | 2 |
| 23e | le | 1 | de | 3 |

Note should be taken that the ratio of length to diameter is approximately the same both in the first as well as in the second capillary, meaning that the following applies:

$$la/da = lb/db = 15$$

Since in this way analogous conditions concerning the shearing stress are created, any wall sliding can be detected and quantified easily by a comparison of the measuring curves.

It can further be seen that the lengths of the fourth and fifth capillaries 23d and 23e are in the magnitude of the diameter. In this way the flow resistance through the capillaries is determined primarily by the inflow pressure loss. Since the diameters dd, de of these two capillaries 23d, 23e correspond to the diameters da, db, dc of the first three capillaries 23a, 23b, 23c it is also possible to determine the pressure loss in the capillaries without the inflow pressure loss.

The capillaries 23d and 23e can be closed off by the screws 24d and 24e in order to keep the material loss low in stationary operation. By closing off the capillaries 23d and 23e, it is further possible to prevent a possible influencing of the other capillaries 23a, 23b and 23c.

Figure 7:
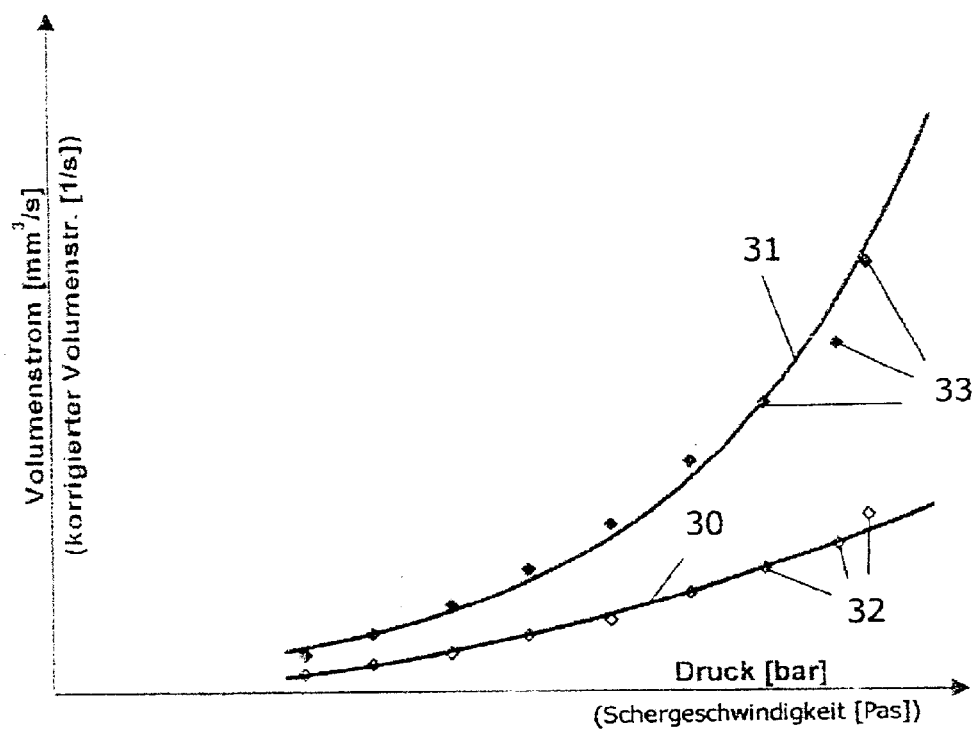
FIGS. 7 and 8 show diagrams for explaining the flow curves.

FIG. 7 shows a diagram representing two flow curves 30, 31 which each consist of nine measuring points 32, 33 and are obtained from measuring channels with different capillaries. They may naturally concern master flow curves as long as they are recorded in their original system which has already been optimized. Every measuring point 32, 33 of the flow curve 30, 31 is obtained at a certain position of the changeable throttle 24 at which a certain volume flow and a certain pressure are obtained.

In order to improve comparability, the volume flow can be standardized in order to obtain a corrected volume flow which is stated in 1/s. Similarly, the pressure can be standardized in order to obtain the shearing speed.

Figure 8:
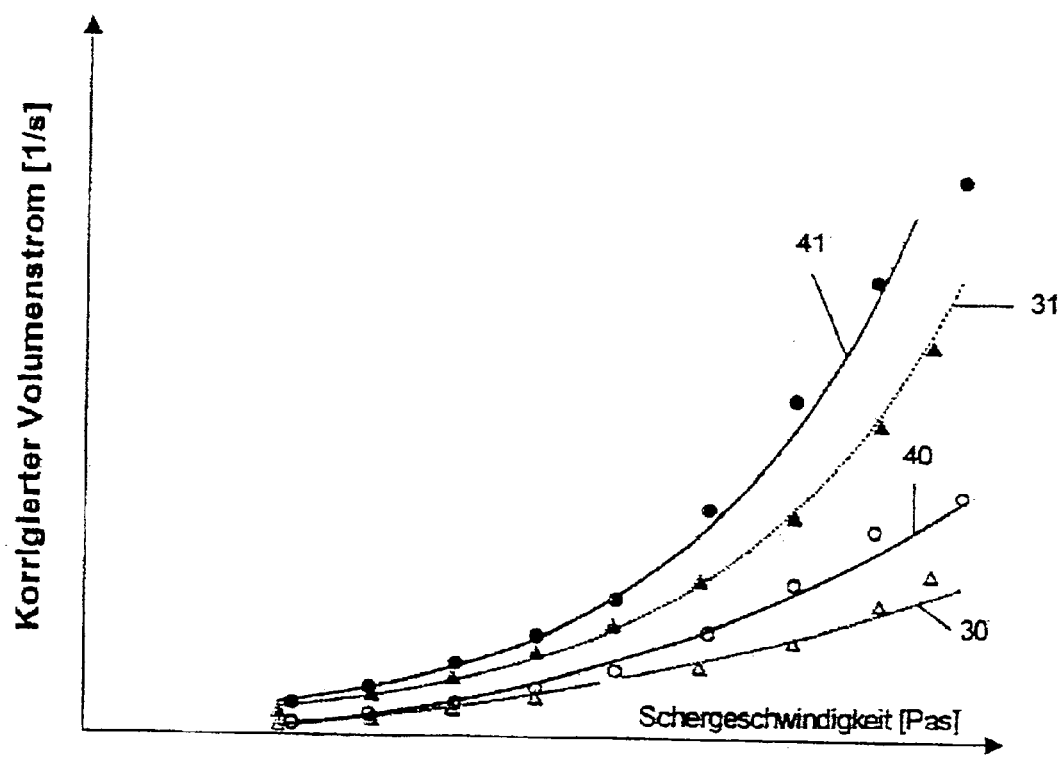

FIG. 8 shows two master flow curves 40, 41 and the associated flow curves 30, 31 of the altered system. The flow curves 30, 31 and 40, 41 can be made to coincide by changing various process parameters. As a result, an increase in temperature will lead to an upward shift of the flow curves 30, 31 and 40, 41. The shape of the flow curves 30, 31 and 40, 41 can be influenced by more subtle measures such as the tempering of the cylinder and the dosing of the material. If such measures should prove to be inadequate, the extrusion screw is changed as the process parameter to be changed by machining or exchanging the same. Similarly, the recipe of the raw material can be changed as the process parameter to be changed.

The method in accordance with the invention and the device in accordance with the invention allow substantially simplifying the adjustment of extrusion dies and can thus be performed more quickly even by less experienced personnel.

What is claimed is:

1. A method for adjusting an extrusion die in an extruder by recording at least one master flow curve in a first extruder to which the extrusion die is optimized, in which curve the volume flow is entered over the pressure, which master flow curve is obtained in a measuring channel which branches off in the extruder, the extrusion die or in any interposed adapter part from the flow channel, and the repeated recording of flow curves in the same or similar measuring channels as in the first extruder after the assembly of the extrusion tool in the extruder to be checked and adjusted, and the purposeful change of process parameters for such a time until the flow curves correspond to the master flow curves within predetermined tolerance ranges.

2. A method as claimed in claim 1, wherein the endless screw speed of the extruder, the dosing speed, the degree of dosing, the tempering of the endless screw and the cylinder tempering are changed as the process parameter to be changed.

3. A method as claimed in claim 1, wherein in that the extruder screw is changed as the process parameter to be changed.

4. A method as claimed in claim 1, wherein the recipe of the raw material is changed as the process parameter to be changed.

5. A method as claimed in claims 1, wherein at least two master flow curves are recorded in that a separate measuring channel is used for each master flow curve.

6. A method for adjusting an extrusion system with an extruder and an extrusion die to a raw material by recording at least one master flow curve in a first extrusion system to which the raw material is optimized, in which curve the volume flow is entered over the pressure, which master flow curve is obtained in a measuring channel which branches off in the extruder, the extrusion die or in any interposed adapter part from the flow channel, and the repeated recording of flow curves in the same or similar measuring channels as in the first raw material after the performance of extrusion tests with the raw material to be examined, and the purposeful change of process parameters for such a time until the flow curves correspond to the master flow curves within predetermined tolerance ranges.

7. A method as claimed in claim 6, wherein the endless screw speed of the extruder, the dosing speed, the degree of dosing, the tempering of the endless screw and the cylinder tempering are changed as the process parameter to be changed.

8. A method as claimed in claim 6, wherein the extruder screw is changed as the process parameter to be changed.

9. A method as claimed in claim 6, wherein the recipe of the raw material is changed as the process parameter to be changed.

10. A method as claimed in claims 6, wherein at least two master flow curves are recorded in that a separate measuring channel is used for each master flow curve.

* * * * *